Figure 1:
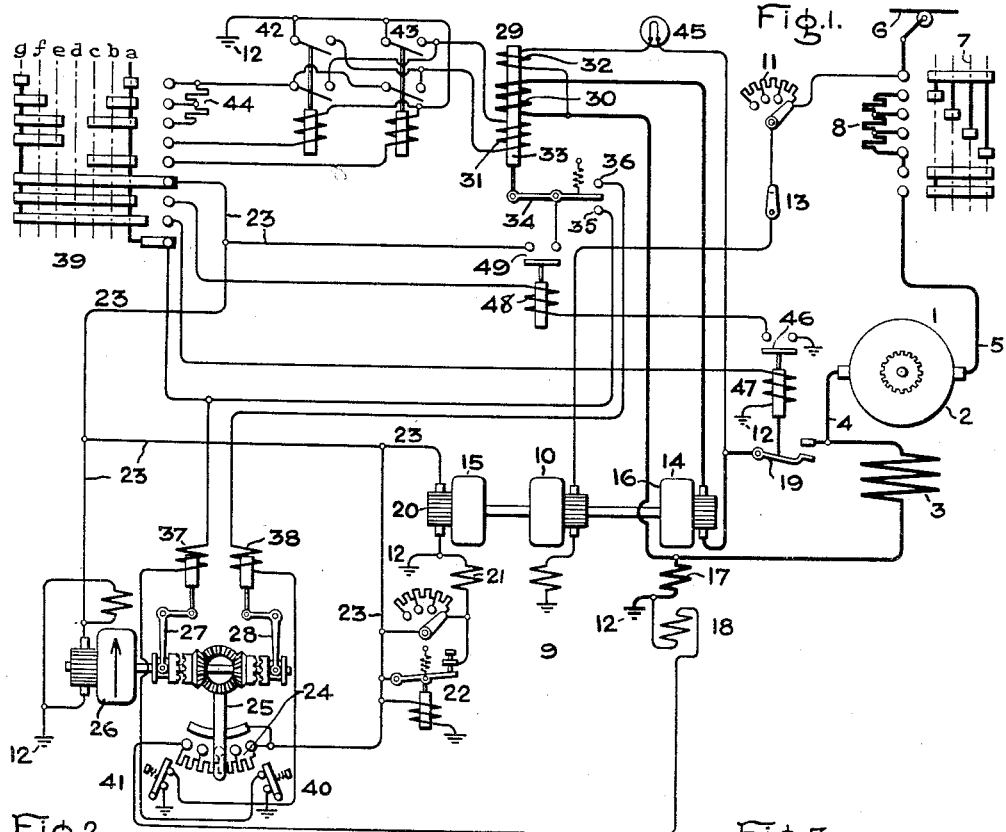

P. W. FORSBERG.
ELECTRICAL SYSTEM OF POWER TRANSMISSION AND REGENERATIVE BRAKING.
APPLICATION FILED OCT. 29, 1917.

1,270,804.

Patented July 2, 1918.

Inventor:
Peter W. Forsberg,
by
His Attorney.

UNITED STATES PATENT OFFICE.

PETER W. FORSBERG, OF SCHENECTADY, NEW YORK, ASSIGNOR TO GENERAL ELECTRIC COMPANY, A CORPORATION OF NEW YORK.

ELECTRICAL SYSTEM OF POWER TRANSMISSION AND REGENERATIVE BRAKING.

1,270,804.

Specification of Letters Patent.

Patented July 2, 1918.

Application filed October 29, 1917. Serial No. 198,994.

*To all whom it may concern:*

Be it known that I, PETER W. FORSBERG, a citizen of the United States, residing at Schenectady, county of Schenectady, State of New York, have invented certain new and useful Improvements in Electrical Systems of Power Transmission and Regenerative Braking, of which the following is a specification.

My invention relates to electrical systems of power transmission and regenerative braking, and particularly to systems of this kind comprising one or more dynamo-electric machines, which are connected to a mechanical load and are adapted to operate alternatively as motors to drive said load or as generators to brake said load, and means for automatically regulating the current generated by said dynamo-electric machines during the generator operation thereof.

In systems of the kind referred to, wherein automatic regulating means are employed to regulate the current traversing the armature of a dynamo-electric machine, during the generator operation thereof, by controlling, directly or indirectly the current traversing a field winding thereof, it necessarily results that, at high armature speeds, the current in said field winding will be lower than at low armature speeds. The torque of said machine is, of course, a function of the currents traversing said armature and field winding. If the values of the current, which the automatic regulating means tend to maintain, be independent of the speed of the armature a material reduction in the braking torque of said machine occurs, with a given setting of said regulating means, as the speed of said armature increases above a predetermined critical value. This characteristic is objectionable as it represents an unstable braking condition, for a given setting of said regulating means, when the speed of the armature exceeds a predetermined critical value.

The object of my invention, broadly stated, is to provide means, in a system of the kind referred to, for preventing any material reduction in the braking torque of the dynamo-electric machine as the speed thereof increases above a predetermined value.

More specifically stated, the object of my invention is to provide means, in a system of the kind referred to, for modifying the action of the automatic regulating means so that as the speed of the dynamo-electric machine increases above a predetermined value, the value of the current which said means tends to maintain will increase.

Other objects of my invention will appear as this specification progresses.

In accordance with my invention, I provide means, operable in accordance with a function of the current traversing a field winding of a dynamo-electric machine, for modifying the action of automatic means, which regulate the current traversing the armature of said dynamo-electric machine by varying the current traversing said field winding.

Figure 2:
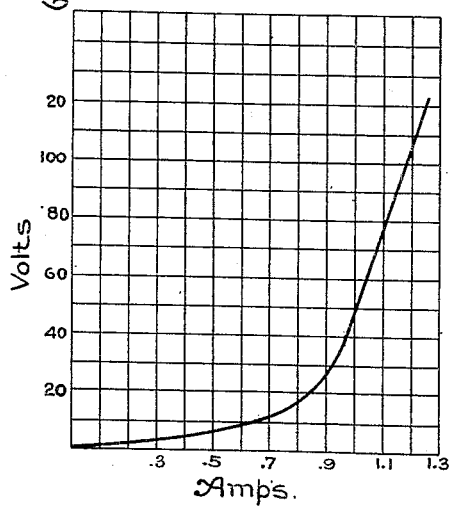
Figure 3:
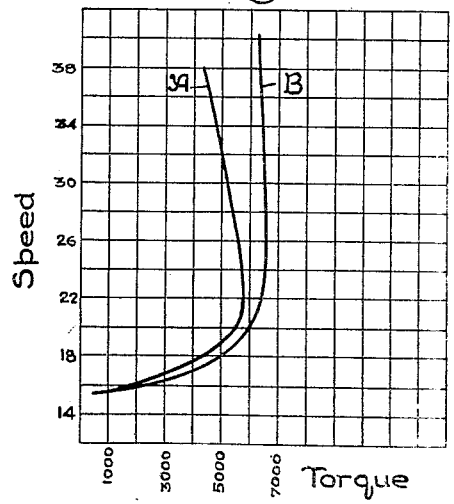

My invention may be most readily understood by reference to the following description and the accompanying drawings in which: Figure 1 is a diagrammatic view of one form of my invention as embodied in one of the several systems, to which it is applicable; Fig. 2 is an explanatory diagram; and Fig. 3 is an explanatory diagram, showing, by means of two curves, the braking speed torque characteristics of a dynamo-electric machine, when employed in the system illustrated in Fig. 1, with a given setting of the regulating means, and both with and without the use of my invention.

Referring to Fig. 1, 1 represents a dynamo-electric machine having an armature 2 and a field winding 3. Two conductors 4 and 5 lead from opposite sides of the armature 2, the former being permanently connected to one terminal of the field winding 3 and the latter being adapted to be connected to the supply main 6 by means of the controller 7, which also controls the starting resistance 8. 9 represents a three machine motor generator set comprising a series motor 10, adapted to be connected, in series with the rheostat 11 and the switch 13, between the supply main 6 and ground 12, an exciter 14, and a generator 15. The exciter 14 comprises an armature 16 and field windings 17 and 18. Two conductors lead from opposite sides of the armature 16, one of which conductors is adapted to be connected to the conductor 4, leading from the armature of the dynamo-electric machine 1, by means of the contactor 19, and the other of which conductors is adapted to be connected, in common with one terminal of the field winding 3 of the dynamo-electric machine 1, to one terminal of the field winding 17. The other terminal of the field winding 17 is connected to ground 12. The generator 15 comprises an armature 20 and a field winding 21. One side of the armature 20 is connected to conductors 23 and the other side is connected to ground 12. One terminal of the field winding 18 is connected through the adjustable rheostat 24 to a conductor 23 and the other terminal of the field winding 18 is connected to ground 12. The voltage of the generator 15 is maintained substantially constant by means of a regulator 22.

The resistance of the rheostat 24 is adjusted by means of the arm 25, which is adapted to be operated by the motor 26 to which it is adapted to be mechanically connected by the electromagnetically operated clutches 27 and 28. The motor 26 is connected between a conductor 23 and ground 12, and therefore is in operation during the operation of the motor-generator set 9. However, movement of the arm 25 occurs only when one of the electromagnetically operated clutches is operated. The operation of the clutches is controlled by a contact making ammeter 29, comprising the windings 30, 31 and 32, the movable core 33, a movable contact 34, connected to said core 33, and stationary contacts 35 and 36, adapted to coöperate with the movable contact 34.

The clutch 27 has an operating winding 37, one terminal of which is connected both to the stationary contact 35 and the lowermost stationary contact of the controller 39, and the other terminal of which is connected to ground 12 through the limit switch 40. The clutch 28 has an operating winding 38, one terminal of which is connected to the stationary contact 36, and the other terminal of which is connected to ground 12 through the limit switch 41. When the arm 25 is moved, due to the energization of winding 37, so as to open switch 40 winding 37 is deënergized and, likewise, when the arm 25 is moved, due to the energization of winding 38, so as to open switch 41 winding 38 is deënergized. In the off position of the controller 39 the winding 37 is energized and the arm 25 moved in a direction to cut in the resistance of the rheostat 24 until the limit switch 40 is opened and the movement ceases.

The winding 30, of the contact making ammeter 29, is connected in series with the armature 16 of the exciter 14. The winding 31, of the contact making ammeter 29, is adapted to be connected through the braking controller 39 and either the contacts controlled by the relay switch 42, or the contacts controlled by the relay switch 43, between a conductor 23 and ground 12. The winding 31 is adapted, depending upon the position of the braking controller 39, either to assist or to oppose the effect of winding 30 upon the core 33. The resistance 44 is adapted to be partially, or wholly, inserted or removed from the circuit of winding 31 by means of the braking controller 39. The winding 32 of the contact making ammeter 29 is connected through a device 45 which may be a tungsten resistor, or a resistor having a similar characteristic, in shunt to the field winding 3. The resistor 45 is of such a character that the current traversing the winding 32, with which it is connected in series, will follow a curve similar to that illustrated in Fig. 2, in which the ordinates represent volts, impressed upon the circuit including the resistor 45 and winding 32, and the abscissas represent amperes, traversing said circuit.

The contactor 19 is provided with an interlocking switch 46 and is operated, simultaneously therewith, by means of the winding 47, which is adapted to be connected between a conductor 23 and ground 12 by means of the controller 39. The interlocking switch 46 is located in the circuit of the operating winding 48 of the relay switch 49, which is adapted to control the connection of the movable contact 34 to a conductor 23. The circuit of the operating winding 48 is also controlled by the controller 39. It is thus evident that the contactor 19 must close before the relay switch 49 can be closed.

The operation of the system illustrated in Fig. 1, as at present understood, is as follows: If it be desired to operate the dynamo-electric machine 1 as a motor, the braking controller 39 will first be moved into the position illustrated, and the contactor 19 will be opened by reason of the deënergization of its operating winding 47. The switch 13 will be maintained closed and the motor-generator set 9 will be maintained in operation. The controller 7 will be then moved to the left, first connecting the armature 2 to the supply main 6 through the conductor 5 and resistance 8. Further movement of the controller 7 will cause the removal of the starting resistance 8. The dynamo-electric machine 1 will then operate as an ordinary series motor, and the current for driving the same will pass from the supply mains 6 through the conductor 5, armature 2, field winding 3, and exciter field winding 17 to ground 12.

If, now, it be desired to operate the dynamo-electric machine as a generator to produce a braking effect, the braking controller 39 will be moved to the position $a$. During the movement of the braking controller 39 to position $a$, the operating winding 47 of the contactor 19 and the interlocking switch 46 are first energized, whereupon the contactor 19 and the switch 46 are closed. The field winding 17 of the exciter 14 preferably has sufficient turns to cause the armature of the exciter 14 to develop a voltage substantially equal to the voltage drop across the field winding 3 so that the mere closing of the contactor 19 will not materially affect the motoring operation of the dynamo-electric machine 1. When the braking controller 39 reaches the position $a$, the operating winding 48 of the relay switch 49 is energized, thereby closing said relay switch and connecting the movable contact 34 to a conductor 23. In position $a$ of the braking controller 39, the operating winding of the relay 43 is energized, thereby closing said relay, whereupon the winding 31, of the contact making ammeter 29, is connected between a conductor 23 and ground 12 so that its action assists that of the winding 30. In position $a$ of the braking controller 39 the resistance 44 is short circuited, and hence the current in the winding 31 is a maximum so that the contact making ammeter 29 tends, through the operation of the adjustable rheostat 24, to vary the current in the field winding 18 of the exciter 14 so as to cause a current of substantially constant and minimum value to traverse the armature of the exciter. In bringing the current traversing the exciter armature to said constant minimum value, the voltage across the exciter armature is raised thereby superexciting the field winding 3 and reversing the direction of current flow in the armature 2 and the exciter field winding 17, which subsequently acts differentially with respect to the field winding 18. The circuit comprising the winding 30 and armature 16 of the exciter 14 constitutes a circuit which is traversed by the current traversing the armature 2 and by the current traversing the field winding 3, during the generator operation of the dynamo-electric machine 1. The effect of moving the braking controller 39 through the successive positions $b$, $c$, $d$, $e$, $f$, and $g$ is first to insert the resistance 44 in series with the winding 31, then to deënergize the operating winding of the relay switch 43, then to energize the operating winding of the relay switch 42, thereby closing said switch, whereupon the winding 31 is connected in series with the resistance 44 between the conductor 23 and ground 12 but in a reverse direction, and then to cut out the resistance 44.

Assuming the braking controller 39 to have been moved to the position $g$, then the contact marking ammeter 29 will respond to the current traversing the winding 30 thereof, and, considering for the moment that the winding 32 is omitted, the dynamo-electric machine 1 will operate with the torque speed characteristic represented by curve A in Fig. 3. In this figure, the ordinates represent speeds of the dynamo-electric machine 1, reduced to miles per hour, and the abscissas represent torque in pounds at one foot radius. It will be noted, upon an inspection of curve A, that, as the speed rises above 22 miles an hour, the torque begins to decrease. This is an objectionable condition, and by adding to the contact making ammeter 29 the winding 32, connected, in series with the resistor 45, across the field winding 3, this reduction in torque as the speed increases above 22 miles an hour, is substantially prevented and the speed torque characteristic represented by the curve B is obtained. This improvement in the characteristic is due to the fact that, for low speeds of the dynamo-electric machine 1, the voltage across the field winding 3 thereof has a relatively high value, and changes in said voltage, attendant upon changes in the field current, produce an inconsiderable effect upon the current in the winding 32 and that, for high speeds of the dynamo-electric machine 1, the voltage across said winding has a relatively low value, and changes in said voltage, attendant upon changes in field current, produce considerable changes in the current traversing the winding 32. This will be evident by reference to the curve illustrated in Fig. 2. Therefore if the windings of the contact making ammeter 29 be proportioned to give the desired braking effect for relatively low speeds of the dynamo-electric machine the action of the winding 32 will be such as substantially to maintain the desired braking torque for high speeds of the dynamo-electric machine.

I conceive that various modifications of my invention may be made and that my invention may be applied to systems other than the one specifically described and illustrated herein, and accordingly I do not desire to be limited to the exact arrangement, herein described and shown, but seek to cover in the appended claims all such modifications and arrangements as fall within the spirit and scope of my invention.

What I claim as new and desire to secure by Letters Patent of the United States, is—

1. The combination with a dynamo-electric machine adapted to operate as a generator and comprising an armature and a field winding, of a circuit adapted to be traversed by current generated by said machine, and automatic means adapted to maintain the current in said circuit substantially constant as the speed of the dynamo-electric machine increases through a lower speed range and to cause the current in said circuit to increase as the speed of the dynamo-electric machine increases through a higher speed range.

2. The combination with a dynamo-electric machine adapted to operate as a generator to produce a braking torque and comprising an armature and a field winding, of a circuit adapted to be traversed by the current generated by said machine, and automatic means controlled by the current in said circuit for varying the current in said field winding and thereby regulating the current generated by said dynamo-electric machine and hence the current traversing said circuit, said automatic means being adapted to maintain the current traversing said circuit substantially constant as the speed of the dynamo-electric machine increases through a relatively lower speed range and to cause the current in said circuit to increase as the speed of the dynamo-electric machine increases through a relatively higher speed range to an extent sufficient substantially to prevent a decrease in the braking torque of said machine as the speed thereof increases.

3. The combination with a dynamo-electric machine adapted to operate as a generator and comprising an armature and a field winding, of a circuit adapted to be traversed by the current generated by said machine, and automatic means controlled by the current in said circuit and by the current in said field winding for varying the current in said field winding and thereby regulating the current generated by said dynamo-electric machine and hence the current traversing said circuit, said automatic means being adapted to maintain the current traversing said circuit substantially constant as the current in said field winding decreases through a range comprising relatively high values and to cause the current in said circuit to increase as the current in said field winding decreases through a range comprising relatively low values.

4. The combination with a dynamo-electric machine adapted to operate as a generator and comprising an armature and a field winding, of a circuit adapted to be traversed by the current generated by said machine, and automatic means controlled by the current in said circuit and by the current in said field winding for varying the current in said field winding and thereby regulating the current generated by said dynamo-electric machine and hence the current traversing said circuit, said automatic means being adapted to maintain the current traversing said circuit substantially constant as the current in said field winding decreases through a range corresponding to relatively low speeds of said dynamo-electric machine and to cause the current in said circuit to increase as the current in said field winding decreases through a range corresponding to relatively high speeds of said dynamo-electric machine.

5. The combination with a dynamo-electric machine adapted to operate as a generator and comprising an armature and a field winding, of automatic means responsive to the current traversing said armature for regulating the current traversing said field winding, and means, the effect of which varies with the current traversing said field winding but less rapidly than the field current when the field current has a relatively high value and more rapidly than the field current when the field current has a relatively low value, for modifying the operation of said automatic means.

6 The combination with a dynamo-electric machine adapted to operate as a generator and comprising an armature and a field winding, of a source of voltage adapted to maintain a voltage across said field winding, a circuit adapted to be traversed by the current generated by said machine, and automatic means for varying the voltage maintained across said field winding, comprising a winding energized in accordance with the current in said circuit and a winding energized in accordance with a function of the current in said field winding.

7. The combination with a dynamo-electric machine adapted to operate as a generator and comprising an armature and a field winding, of a source of voltage adapted to maintain a voltage across said field winding, a circuit adapted to be traversed by the current generated by said machine, and automatic means for varying the voltage maintained across said field winding, comprising a winding, energized in accordance with the current in said circuit, and a winding, adapted to be energized by a current which is a function of the current traversing said field winding and varies less rapidly than said field current when said field current has a value above a predetermined value, and more rapidly than said field current, when said field current has a value below a predetermined value.

8. The combination with a dynamo-electric machine adapted to operate as a generator and comprising an armature and a field winding, of a separate source of voltage adapted to maintain a voltage across said field winding, a circuit adapted to be traversed by the current generated by said machine, automatic means, for varying the voltage maintained across said field winding, comprising a winding, energized in accordance with the current in said circuit, a winding, energized in accordance with a function of the current in said field circuit, and a winding for modifying the effect of the first and second named windings, and means for adjustably energizing the third named winding.

9. The combination with a dynamo-electric machine adapted to operate as a generator and comprising an armature and a field winding, of a separate source of voltage adapted to maintain a voltage across said field winding, a circuit adapted to be traversed by the current generated by said machine, and automatic means, for varying the voltage maintained across said field winding, comprising a winding, energized in accordance with the current in said circuit, and a winding connected, in series with a current controlling device, in shunt to said field winding, said device being adapted to cause the current in said last named winding to vary less rapidly than the current in said field winding when the field current varies through certain values and more rapidly than the current in said field winding when the field current varies through certain other values.

10. The combination with a dynamo-electric machine adapted to operate as a generator and comprising an armature and a field winding, of a separate source of voltage adapted to maintain a voltage across said field winding, a circuit adapted to be traversed by the current generated by said machine, and automatic means, for varying the voltage maintained across said field winding, comprising a winding, energized in accordance with the current in said circuit, and a winding connected, in series with a current controlling device, in shunt to said field winding, said device having the characteristic that with increase in current therein its resistance increases materially.

11. The combination with a dynamo-electric machine adapted to operate as a generator and comprising an armature and a field winding, of a separate source of voltage adapted to maintain a voltage across said field winding, a circuit adapted to be traversed by the current generated by said machine, and automatic means, for varying the voltage maintained across said field winding, comprising a winding, energized in accordance with the current in said circuit, and a winding connected, in series with a tungsten resistor, in shunt to said field winding.

12. The combination with a dynamo-electric machine adapted to operate as a generator and comprising an armature and a field winding, of a separate source of voltage adapted to maintain a voltage across said field winding, a circuit adapted to be traversed by the current generated by said machine, automatic means, for varying the voltage maintained across said field winding, comprising a movable member and a plurality of windings controlling the operation of said member, one of said windings being adapted to be energized in accordance with the current in said circuit, another of said windings being adapted to be energized in accordance with a function of the current in said field winding, and variable means for energizing another of said windings to adjustably control the operation of said automatic means.

13. The combination with a dynamo-electric machine adapted to operate as a motor to drive a load or as a generator to brake a load and comprising an armature and a field winding, of a separate source of voltage adapted to maintain a voltage across said field winding during the generator operation of said machine, a circuit adapted to be traversed by the current generated by said machine, and automatic means, controlled by the current in said circuit, for varying the voltage maintained across said field winding and thereby regulating the current generated by said machine, and means, operable in accordance with a function of the current traversing said field winding, for modifying the operation of said automatic means.

14. The combination with a dynamo-electric machine adapted to operate as a motor to drive a load or as a generator to brake a load and comprising an armature and a field winding, of means for separately exciting said field winding during the generator operation of said machine, a circuit adapted to be traversed by the current generated by said machine, and automatic means controlled by the current in said circuit to vary the voltage of the first said means and thereby to regulate the current generated by said machine, and means operable in accordance with a function of the current traversing said field winding for modifying the operation of said automatic means.

15. The combination with a dynamo-electric machine adapted to operate as a motor to drive a load or as a generator to brake a load and comprising an armature and a series field winding, of an exciter comprising an armature and a field winding, means for exciting said exciter field winding, means for connecting said exciter armature in shunt to the series field winding of said dynamo-electric machine during the generator operation thereof, automatic means, controlled by the current traversing said exciter armature, for varying the current in said exciter field winding, and means operable in accordance with a function of the current traversing the series field winding of said dynamo-electric machine for modifying the operation of said automatic means.

16. The combination with a dynamo-electric machine adapted to operate as a motor to drive a load or as a generator to brake a load and comprising an armature and a series field winding, of an exciter comprising an armature and a field winding, means for exciting said exciter field winding, means for connecting said exciter armature in shunt to the series field winding of said dynamo-electric machine during the generator operation thereof, automatic means, controlled by the current traversing said exciter armature and by the current traversing the series field winding of said dynamo-electric machine, for varying the current in said exciter field winding so as to maintain the current traversing said exciter armature substantially constant as the current in the series field winding of said dynamo-electric machine decreases through a range corresponding to relatively low speeds of said machine and to cause the current traversing said exciter armature to increase as the current in the series field winding of said dynamo-electric machine decreases through a range corresponding to relatively high speeds of said machine.

17. The combination with a dynamo-electric machine adapted to operate as a motor to drive a load or as a generator to brake a load and comprising an armature and a series field winding, of an exciter comprising an armature and a field winding, means for exciting said exciter field winding, means for connecting said exciter armature in shunt to the series field winding of said dynamo-electric machine during the generator operation thereof, automatic means, for varying the current in said exciter field winding, comprising a winding, energized in accordance with the current traversing the exciter armature, a winding, energized in accordance with a function of the current traversing the series field winding of said dynamo-electric machine, and a winding for modifying the effect of said first and second named windings, and means for adjustably energizing the last named winding.

18. The combination with a dynamo-electric machine adapted to operate as a motor to drive a load or as a generator to brake a load and comprising an armature and a series field winding, of an exciter comprising an armature, a main field winding and an auxiliary field winding, said auxiliary field winding being connected in series relation with the armature of said dynamo-electric machine and adapted, during the generator operation thereof, to act differentially with respect to said main field winding, means for connecting said exciter armature in shunt to the series field winding of said dynamo-electric machine during the generator operation thereof, automatic means, for varying the current in said exciter field winding, comprising a winding, energized in accordance with the current traversing the exciter armature, a winding, energized in accordance with a function of the current traversing the series field winding of said dynamo-electric machine, and a winding for modifying the effect of said first and second named windings, and means for energizing the last named winding, and means for varying the energization of the last named winding and for controlling the means for connecting the exciter armature in shunt to the series field winding of said dynamo-electric machine.

In witness whereof, I have hereunto set my hand this twentieth day of October, 1917.

PETER W. FORSBERG.